US006507173B1

(12) United States Patent
Spiridon et al.

(10) Patent No.: US 6,507,173 B1
(45) Date of Patent: Jan. 14, 2003

(54) SINGLE CHIP POWER MANAGEMENT UNIT APPARATUS AND METHOD

(75) Inventors: Constantin Spiridon, San Jose, CA (US); Vlad Mihail Popescu-Stanesti, San Jose, CA (US); You-Yuh Shyr, San Jose, CA (US); Alexandru Hartular, Campbell, CA (US); William L. Densham, III, Los Gatos, CA (US)

(73) Assignee: 02 Micro International Limited, Grand Cayman (KN)

( * ) Notice: Subject to any disclaimer, the term of this patent is extended or adjusted under 35 U.S.C. 154(b) by 0 days.

(21) Appl. No.: 09/951,991

(22) Filed: Sep. 13, 2001

Related U.S. Application Data
(60) Provisional application No. 60/300,549, filed on Jun. 22, 2001.

(51) Int. Cl.[7] .................................................. H02J 7/04
(52) U.S. Cl. ......................................... 320/162; 320/137
(58) Field of Search ................................. 320/162, 137, 320/160, 136; 326/37, 38; 361/56, 72

(56) References Cited

U.S. PATENT DOCUMENTS 6,149,319 A * 11/2000 Richter et al. ......... 395/750.01
6,278,290 B1 * 8/2001 Young ........................ 326/41

* cited by examiner

Primary Examiner—Edward H. Tso
Assistant Examiner—Lawrence Luk
(74) Attorney, Agent, or Firm—Grossman Tucker Perreault & Pfleger, PLLC (57) ABSTRACT

A power management unit (PMU) apparatus and method may include: a bi-directional pin configured to serve as an input pin during a first condition and as an output pin during a second condition; or a battery charge controller for providing a first conditioning charge and a second full charge to a voltage source of the PMU; or an adapter detector configured to detect the presence of a continuous output adapter and a pulse output adapter; an under voltage lockout protection circuit to prevent start up of the PMU until a power source reaches a predetermined threshold lockout level and to shut down the PMU once the power source reaches a lower threshold lockout disabling level; or a plurality of internal switches for allowing an external switch to have multiple functions; or a power on reset circuit; or multi-output charge status pin.

71 Claims, 7 Drawing Sheets

SINGLE CHIP POWER MANAGEMENT UNIT APPARATUS AND METHOD

CROSS REFERENCE TO RELATED APPLICATION

The present application claims the benefit of the filing date of U.S. Provisional Application No. 60/300,549 filed Jun. 22, 2001, the teachings of which are incorporated herein by reference.

FIELD OF THE INVENTION

This invention relates in general to portable powered devices, and in particular to a single chip power management unit for providing both power supply and power charging functions.

BACKGROUND OF THE INVENTION

Portable devices, e.g., cell phones, pagers, laptop computers, personal digital assistants, and the like, require accurate, stable, low dropout regulated voltages to various sensitive load modules in such devices. Such load modules vary with each device, but may include digital loads, analog loads, a reference oscillator, and a real time clock to name a few. Such devices are typically powered by a battery, but may be powered with other voltage sources such as a solar source. Such power sources often provide unregulated voltage. Batteries may provide a voltage source that varies considerably over its useful life and with the amount of load placed on it. When multiple batteries are used in series, such problems are compounded. Thus, the various load modules in such devices cannot operate off direct battery voltage. In addition, such devices also require a battery charging mechanism.

To condition an input voltage source and provide a regulated supply voltage to separate load modules in such devices, a low-dropout voltage regulator (LDO) is typically utilized. LDOs are typically integrated circuits that provide conditioned output voltages over varying loads with minimal voltage dropout over a relatively wide input voltage and operating temperature range. LDOs may provide a fixed output voltage or a varied output voltage. There may also be other circuits to monitor battery voltage and implement functions such as charging the battery. Such power management solutions typically use a larger number of separate integrated circuits for separate functions, which require a large area on a printed circuit board.

Other portable devices may have a power management unit (PMU) including one or more LDOs to condition an input voltage source and provide a regulated supply voltage to separate load modules and to provide other functionality. Such PMUs, however, separate the battery charging function from the PMU function. That is, the battery charger is a separate integrated circuit that uses external transistors, e.g., MOS transistors, to perform the charging function.

Other PMUs may have several LDOs with additional functionality and include a battery charging function. However, such PMUs typically require an external power FET to pass high charging current to the battery. In addition, PMUs that include battery-charging functionality have an input for connecting an AC-DC adapter to charge the battery that cannot be used to supply other external devices with power from the battery. In addition, such PMUs cannot generally work with certain types of AC-DC adapters such as ones that have a pulsing output.

Accordingly, there is a need for a system and method that overcomes the above deficiencies in the prior art and provides a PMU on a single chip for providing both power supply and battery charging functions with improved additional functional features such as battery charge controller functionality, under voltage lockout, start/stop, power on reset, and others.

SUMMARY OF THE INVENTION

A PMU consistent with the present invention includes a substrate and a bi-directional pin coupled to the substrate and configured to serve as an input pin during a first condition and as an output pin during a second condition. The first condition may be a charging condition and the second condition may be a supply condition.

A PMU consistent with the present invention may also include a battery charge controller coupled to the substrate. The battery charge controller may have a first charge conductive path providing a first conditioning charge to a battery, and a second charge conductive path providing a second charge conductive path to the battery. The first conditioning charge may be applied to the battery if the output voltage of the battery is below a predetermined full charge threshold level. The first conditioning charge may also be less than the second full charge.

A PMU consistent with the present invention may also include an adapter detector configured to receive a signal representative of the voltage of an external device coupled to the bi-directional pin, and to provide a detector output signal representative of the presence of an adapter. The detector output may provide a positive indication if the adapter is a continuous output adapter or if the adapter is a pulse output adapter. The adapter detector may further include a first detector conductive path configured to receive a signal representative of the voltage of the external device and provide a first detector path output indicative of the presence of a continuous output adapter, a second detector conductive path configured to receive the signal representative of the voltage of the external device and provide a second detector path output indicative of the presence of a pulse output adapter; and an output decision circuit configured to receive the first detector path output and the second detector path output and output a digital one if at least one of the outputs is a digital one.

A PMU consistent with the present invention may also include an under voltage lockout protection circuit configured to prevent start up of the PMU until the voltage of the battery is above a threshold lockout enabling level, and configured to shut down the PMU once the voltage of the battery falls below a threshold lockout disabling level. The threshold lockout disabling level may be set at a lower voltage than the lockout threshold enabling level. The under voltage lockout protection circuit may be further configured to disable the PMU after the voltage of the battery falls below the threshold lockout disabling level for a predetermined lockout delay time.

A PMU consistent with the present invention may also include a plurality of internal switches coupled to a switch conductive path. The switch conductive path may be further coupled to an external switch. The internal switch may be responsive to the external switch allowing the external switch to have multiple functions.

A PMU consistent with the present invention may also include a power on reset (POR) circuit and at least one LDO. The POR circuit may provide a control signal to enable an external controller to start working once at least one LDO has an output voltage that reaches a predetermined LDO voltage threshold level after a predetermined reset time.

A PMU consistent with the present invention may also include a multi-output charge status pin. The multi-output charge status pin may be configured to display the presence or absence of an AC-DC adapter, and an end-of-charge signal.

A method of inputting and outputting power to and from a PMU consistent with the present invention includes connecting an external device to a bi-directional pin of said PMU, triggering a first condition or a second condition, inputting power through the bi-directional pin from the external device during the first condition, and outputting power through the bi-directional pin to the external device from the voltage source of the PMU during said second condition.

A method of detecting an AC-DC adapter coupled to a PMU consistent with the present invention includes receiving a signal representative of the voltage of an external device, providing a positive indication if the adapter is a continuous output adapter, and providing a positive indication if said adapter is a pulse output adapter.

A method of protecting a PMU from entering a start up mode consistent with the present invention includes detecting the voltage of a power source for the PMU, preventing start up of the PMU if the voltage of the power source is below a predetermined threshold lockout enabling voltage level, and shutting down the PMU if the voltage of the power source is below a predetermined threshold lockout disabling voltage level set lower than said threshold lockout enabling voltage level.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
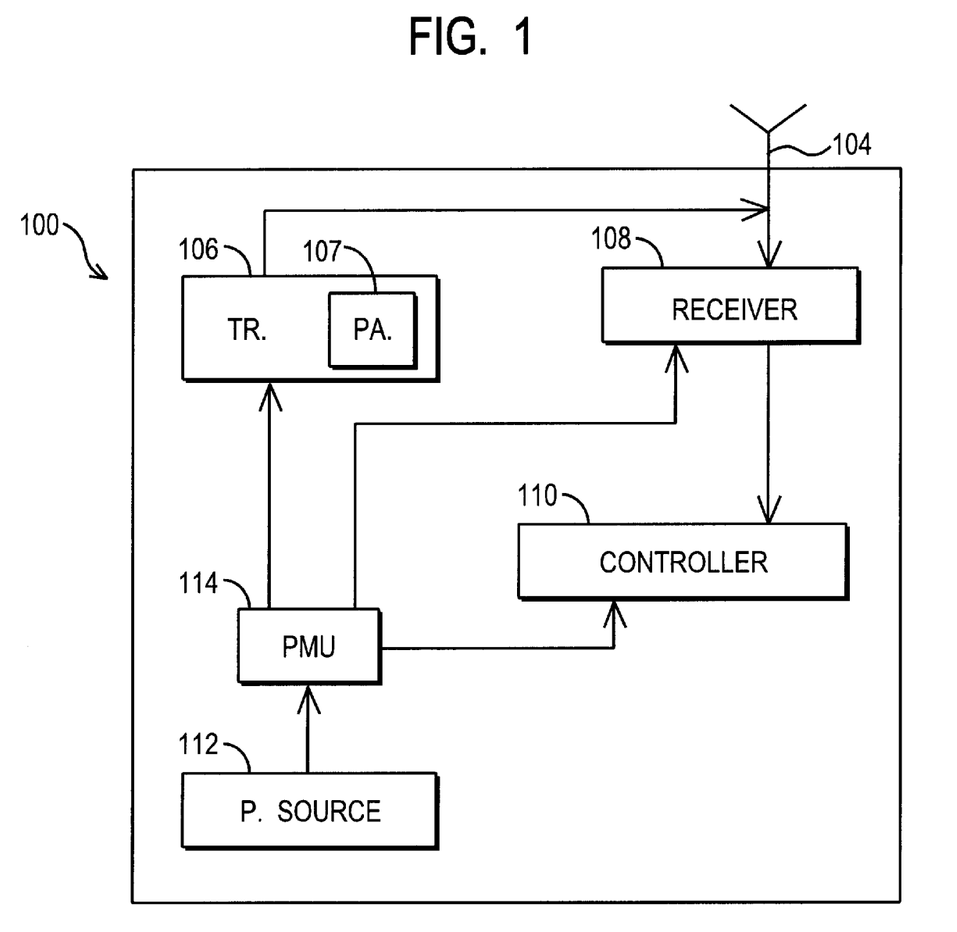
FIG. 1 is a block diagram of one exemplary portable battery device including a PMU consistent with the present invention.

FIG. 1 illustrates a block diagram of one exemplary voltage-driven, e.g., battery-driven, device, or a cell phone 100, which may include a PMU 114 consistent with the present invention. It is to be understood, however, that the present invention is not limited to the illustrated exemplary voltage-driven device. Rather, the present invention may be incorporated into a wide variety of voltage driven devices such as pagers, laptop computers, personal digital assistants, a personal communication system terminal, and the like, without departing from the spirit and scope of the invention. In addition, the block diagram of FIG. 1 is illustrated as a high-level block diagram for simplicity and ease of explanation. Therefore, other functional elements may be incorporated into an exemplary portable battery device consistent with the present invention.

The cell phone 100 may include an antenna 104, a transmitter 106, a receiver 108, a controller 110, a power source 112, e.g., a battery, and a PMU 114. The transmitter 106 may process, filter, modulate, and amplify information-bearing signals that may be sent from the cell phone 100 to a base station (not shown). The transmitter may also include a power amplifier 107 to provide such amplification. In turn, the receiver 108 may receive information bearing signals from a base station, such as voice or data signals, and filter, demodulate, and process such signals. The controller 110, e.g. a base band processor, performs a variety of functions including processing the received information bearing signals such that voice information may be played as audio signals on a speaker, or data information may be appropriately displayed, e.g., on an LCD display.

The exemplary cell phone 100 may also include a PMU 114 consistent with the present invention. The PMU 114 receives power from the power source 112 and conditions the power to provide regulated voltage levels to various modules in the cell phone 100 that are sensitive to input voltage. Such modules may be located in the transmitter 104, receiver 108, controller 110, or elsewhere. Advantageously, the PMU 114 includes a battery charging function and other improved functionality such as under voltage lockout, start/stop, power on reset, bi-directional pin, and the like as described herein.

Figure 2:
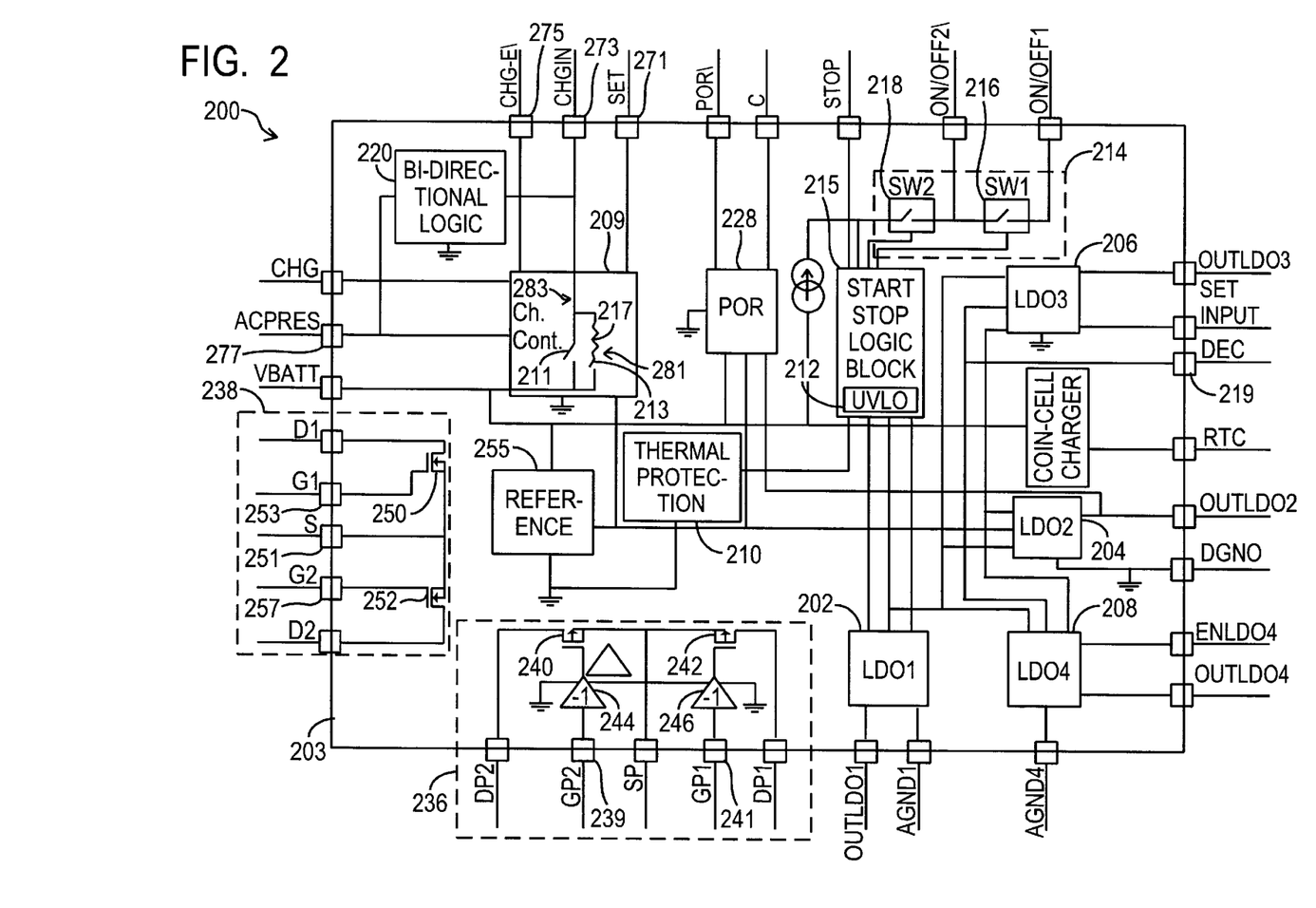
FIG. 2 is a block diagram of an exemplary PMU consistent with the present invention.

Turning to FIG. 2, a block diagram of an exemplary PMU 200 is illustrated. Advantageously, all the PMU components are coupled to a common substrate 203 to produce a reliable PMU with printed circuit board savings. The illustrated embodiment has four LDOs 202, 204, 206, 208. Other embodiments may contain one or more LDOs depending on the portable battery device's power requirements. The LDOs may be supplied with a reference voltage by reference 255. An exemplary reference may provide an internal 1.50 volt band gap voltage reference 255, while internally sourcing a maximum of 0.02 mA. With such an exemplary reference, external decoupling capacitors are advisable. Decoupling capacitors may be coupled external to the PMU 200 at pin "DEC" 219. A range of capacitor values may be between 220 nanofarads and 1 microfarad. Such a filter capacitor preferably has a low equivalent series resistance (esr) and inductance (esl), e.g., a ceramic dielectric, and preferably may be mounted close to pin "DEC" 219.

The LDOs may provide a fixed or variable voltage output. For the exemplary PMU 200, the first LDO 202, second LDO 204, and fourth LDO 208 may provide a fixed voltage output, and third LDO 206 may provide a variable voltage output. The third LDO 206 may be further configured to provide an output voltage $V_O$ in the 1.8–2.4 volt range. There are many ways to configure a LDO to provide a variable voltage output. One exemplary way is by using a resistor divider external to the PMU 200. Such a resistor divider may include two variable resistors, $R_{set1}$ and $R_{set2}$, where the output voltage $V_O$ is equal to the following relationship among $R_{set1}$ $R_{set2}$, and $V_{ref}$ provided by reference 255:

$$V_O = V_{ref} \times (1 + R_{set1}/R_{set2}).$$

If the reference voltage $V_{ref}$ is 1.5 volts, $R_{set1}$ and $R_{set2}$ can be set to the following exemplary values illustrated in Table 1 to achieve the exemplary output voltage range of 1.8–2.4 volts.

TABLE 1

| Output Voltage ($V_o$) | Resistance Values KΩ | |
| --- | --- | --- |
| | $R_{set1}$ | $R_{set2}$ |
| 1.8 | 30.1 | 150 |
| 2.0 | 49.9 | 150 |
| 2.2 | 69.8 | 150 |
| 2.4 | 88.7 | 147 |

To arrive at these resistor values, divider current was chosen to be approximately 10 μA by setting $R_{set2}$ to 150 kΩ. $R_{set1}$ was then calculated where:

$$R_{set1} = R_{set2} \times (V_O/V_{ref}) - 1.$$

In the instance where the output voltage $V_O$ is 2.4 volts, the value of $R_{set2}$ was chosen to be slightly lower than the 150 kΩ value, or at 147 kΩ, in order to ensure that $V_{out}$ has less than 1% tolerance accuracy.

Figure 3A:
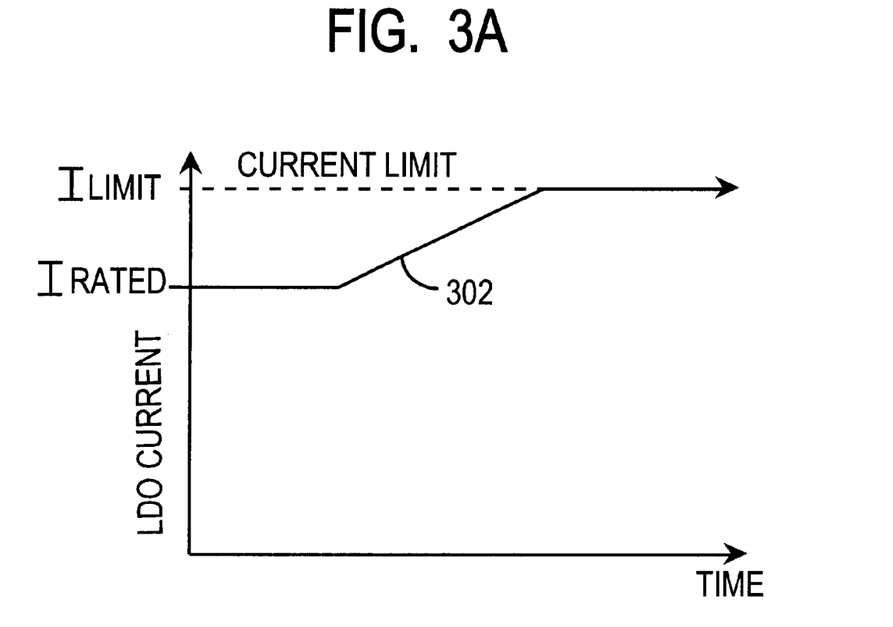
FIG. 3A is an exemplary plot of current versus time illustrating a short circuit current protection mechanism for an exemplary LDO.

Each LDO may be equipped with internal short circuit protection mechanisms to protect against excessive current flow that may cause damage to internal LDO served load modules. Such a short circuit protection mechanism detects when the output current rises above its rated current level $I_{rated}$ and clamps such a rising current at a current limit level $I_{limit}$ in order to prevent any damage to LDO load modules as illustrated in FIG. 3A with an exemplary plot 302 of LDO current versus time. This current limit level may be approximately 30% greater than its rated current level of, e.g., 50 mA, for some LDOs. Current is clamped at this $I_{limit}$ level until the fault condition is corrected or until some other safety mechanism, e.g., thermal protection mechanism, shuts down the PMU.

Figure 3B:
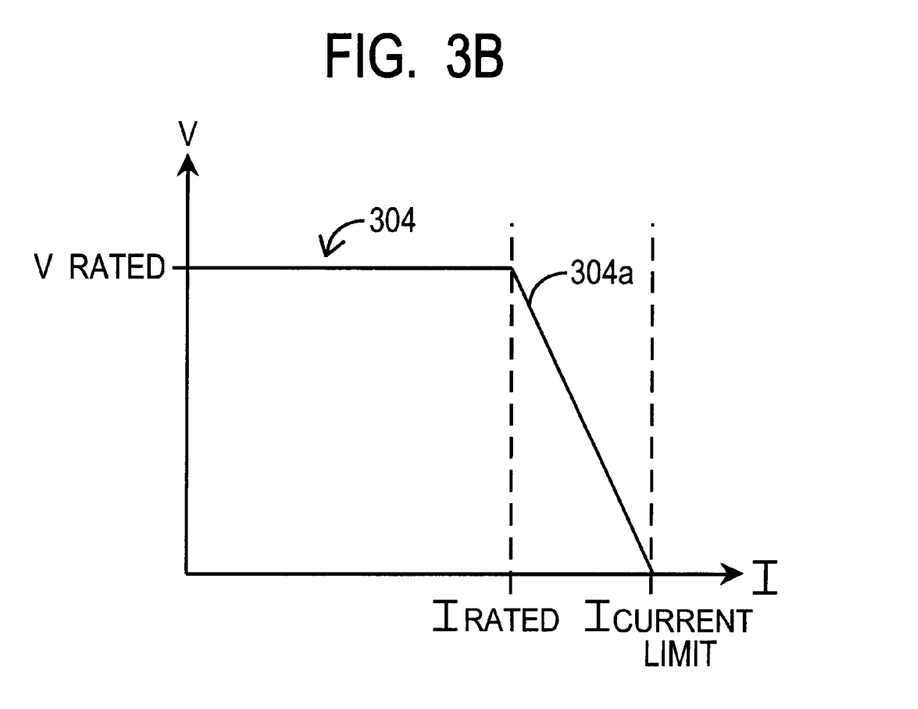
FIG. 3B is an exemplary plot of voltage versus time illustrating a short circuit voltage protection mechanism for an exemplary LDO.

FIG. 3B illustrates the effect of such a short circuit fault condition on LDO voltage. An exemplary plot 304 of LDO voltage versus current illustrates how during a short circuit fault condition, the LDO output voltage typically scales back to approximately zero voltage in a substantially linear fashion over that portion 304a of the exemplary plot 304 until the over current fault condition is corrected. When the over current fault condition is corrected, the LDO output voltage may return to is rated level $V_{rated}$.

A PMU consistent with the present invention may include a thermal protection unit 210 to protect the PMU against high internal temperatures caused by any number of conditions including internal short circuit faults. The thermal protection unit may sense die temperature and trigger the PMU to shut down when a specified threshold temperature level is exceeded. An exemplary threshold temperature level may be 125° C. Since the PMU is shut down, the portable battery device will also be shut down. The user of the device will then have to turn the device back on. However, the thermal protection unit 210 may also include a temperature band range below the threshold temperature level, e.g., 15° C., that will not permit the user to turn the device back on until the die temperature drops below the temperature band range. For example, at an exemplary threshold temperature of 125° C. and an exemplary temperature band range of 15° C., the PMU may not permit a user to turn on the device until the die temperature drops below 110° C.

A PMU consistent with the present invention may also include an under voltage lockout (UVLO) protection circuit 212 that prevents the PMU from starting until an enabling or satisfactory battery voltage level is present. Such UVLO circuit 212 may be included in the start/stop logic block 212 of the PMU 200 and coupled to the battery voltage $V_{BATT}$ and corresponding LDOs. Because low battery voltage conditions may occur during start up of a battery device, the UVLO circuit 212 may be another correction mechanism to help eliminate abnormal power-up conditions.

Figure 4:
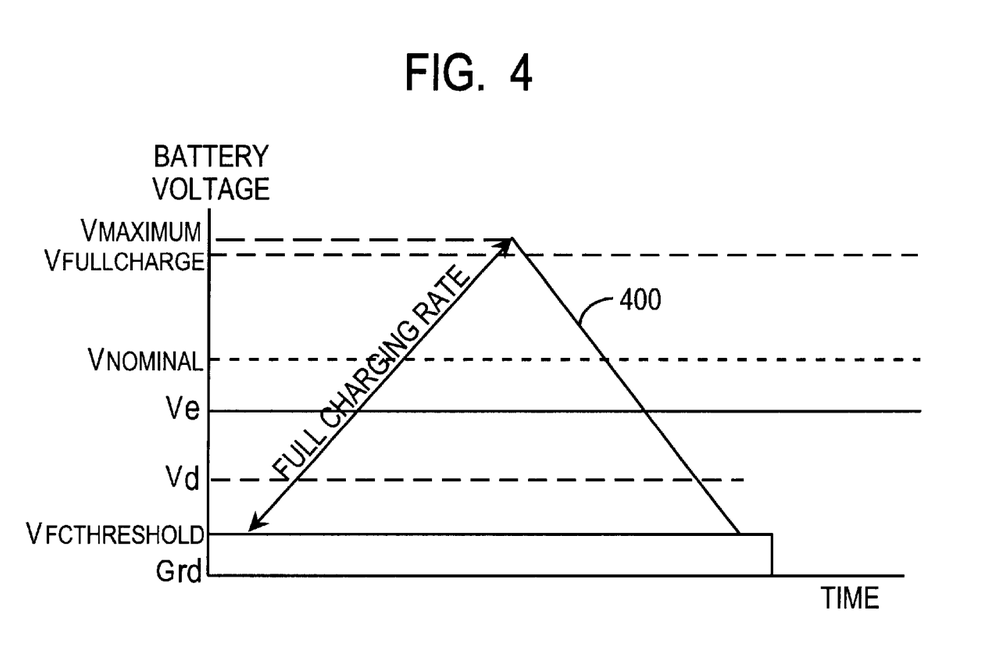
FIG. 4 is an exemplary plot of battery voltage versus time illustrating the functionality of an under voltage lockout protection circuit consistent with the present invention.

FIG. 4 illustrates the functionality of an UVLO circuit 212 consistent with the present invention. An exemplary plot of battery voltage 400 over time is plotted. A full charging rate is applied once the battery voltage exceeds a full charge threshold level $V_{fcthreshold}$ as described more with reference to FIG. 8. The LDOs are generally enabled once a threshold lockout enabling voltage level $V_e$ is reached. However, the LDOs may then further undergo their own Power On Reset check to ensure their output voltage is acceptable as described in more detail with reference to FIG. 5.

An UVLO circuit 212 consistent with the present invention may also include other features to prevent premature shut down of the PMU by the UVLO circuit 212 once the PMU is on. For instance, once the LDO output voltages are enabled after the battery voltage exceeds an enabling voltage level $V_e$, the UVLO circuit 212 may utilize a threshold lockout disabling voltage level $V_d$ to disable the PMU. This $V_d$ level may be less than the $V_e$ level, e.g., about 90% of the $V_e$ level. This helps prevent premature shutdown in some instances. For example, a cell phone and other portable battery devices may include a power amplifier 107. When the power amplifier is activated, it may require current in the 1.5 amp range causing a voltage drop on the battery of greater than 300 millivolts. Having the $V_d$ level less than the $V_e$ level gives some additional leeway to account for such voltage drops that are not intended to trigger the UVLO circuit.

In addition to the lower $V_d$ level in comparison to the $V_e$ level, a predetermined lockout delay time may also be utilized to prevent short duration negative voltage spikes from prematurely activating the UVLO circuit 212, and hence tripping the PMU. In this instance, the battery voltage would have to drop below $V_d$ for longer than a predetermined lockout delay time in order for the UVLO circuit to activate and trip the PMU. In one exemplary embodiment, the lockout delay time may be set to 50 ms. To ensure proper operation of the lockout delay time in some instances, a command from an external controller 110 to disable operation of the battery once the battery voltage reaches some voltage level may have to be deactivated.

Once the threshold lockout enabling voltage level $V_e$ is reached and consequently the UVLO circuit 212 permits enabling of the LDOs, a Power On Reset (POR) circuit 228 may monitor output voltage of the LDO to ensure that the LDO output voltage reaches a certain threshold level for a predetermined reset time $t_{reset}$ before the PMU sends a signal to the controller 110 indicating normal operation may begin. The POR circuit 228 may be coupled to the output of one or more LDOs.

Figure 5:
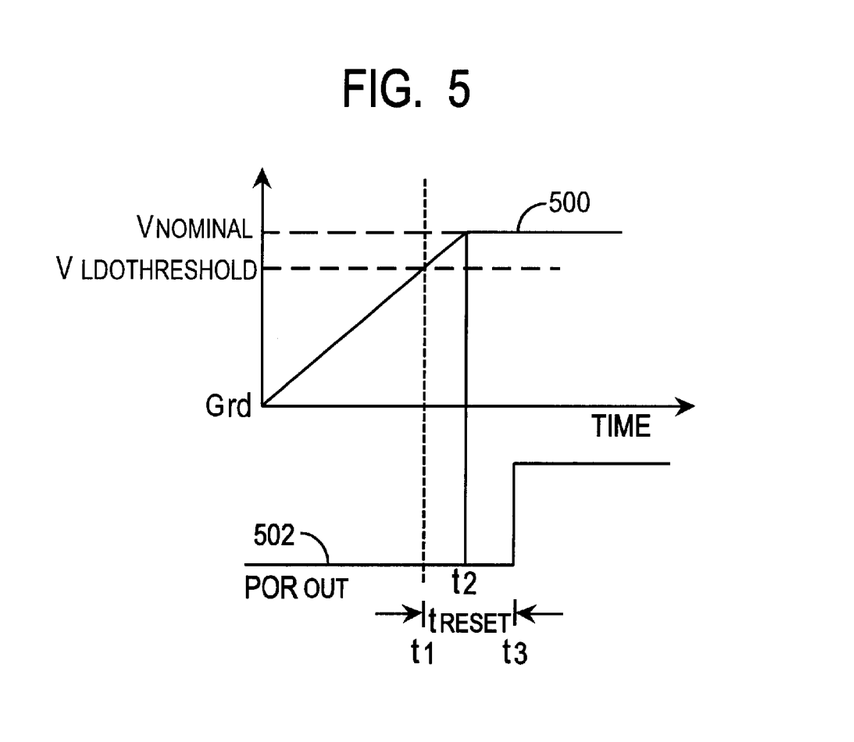
FIG. 5 is an exemplary plot of LDO output voltage versus time illustrating the functionality of a Power on Reset (POR) configuration consistent with the present invention.

FIG. 5 illustrates functional operation of an exemplary POR circuit 228 with a plot 500 of LDO output voltage versus time. As the LDO output voltage reaches a predetermined threshold LDO voltage level $V_{LDOthreshold}$ at time $t_1$, a reset time $t_{reset}$ is triggered. After $t_{reset}$ expires at time $t_3$, the POR circuit sends a POR control signal 502 to the controller 110 indicating normal operation may begin. As illustrated in FIG. 5, a POR control signal 502 coupled to the controller 110 from the POR circuit 228 may be held at a low level until expiration of $t_{reset}$ at time t3. At that time, the control signal may be switched to a high level. In this way, the controller needs to receive the POR control signal 502 in order to start its software from the proper address. If the $V_{LDOthreshold}$ level from the LDO is not reached or is not reached after expiration of the reset time period $t_{reset}$, then a proper POR control signal 502 will not be sent to the external controller 110. If the LDO output voltage level is below $V_{LDOthreshold}$, this may allow the external controller 110 to reset itself until the proper LDO voltage recovers.

An exemplary $V_{LDOthreshold}$ may be 90% of the nominal LDO voltage, $V_{nominal}$, or 2.52 volts of a nominal 2.80 volt level. An exemplary $t_{reset}$ may be 50 ms. Those skilled in the art will recognize various circuits that can implement such threshold levels and delay times. The reset time may be set by an external capacitor for instance.

The start/stop logic block 215 of the PMU may control the start/stop functions for the PMU and hence the device that it is coupled to. For instance, with some portable battery devices, e.g., a cell phone, an on/off switch such as a start/stop button may be located in a user keypad matrix external to the PMU. Typically GSM standards require that a user depress such button for more than a certain amount of time, or 500 ms, to activate or deactivate the cell phone depending on the cell phone's current condition. For example, if a cell phone is currently off and the on/off button is depressed for more than at least 500 ms, then the start process is enabled. If a cell phone is currently on and the on/off button is depressed for more than at least 500 ms, then the stop process is enabled. If the on/off button is depressed for less than 500 ms, then there is no change in the original condition. An additional guard band time of, e.g., 150 ms, may also be used such that the user would then need to depress the on/off button for more than 650 ms to activate or deactivate the device.

Figure 6A:
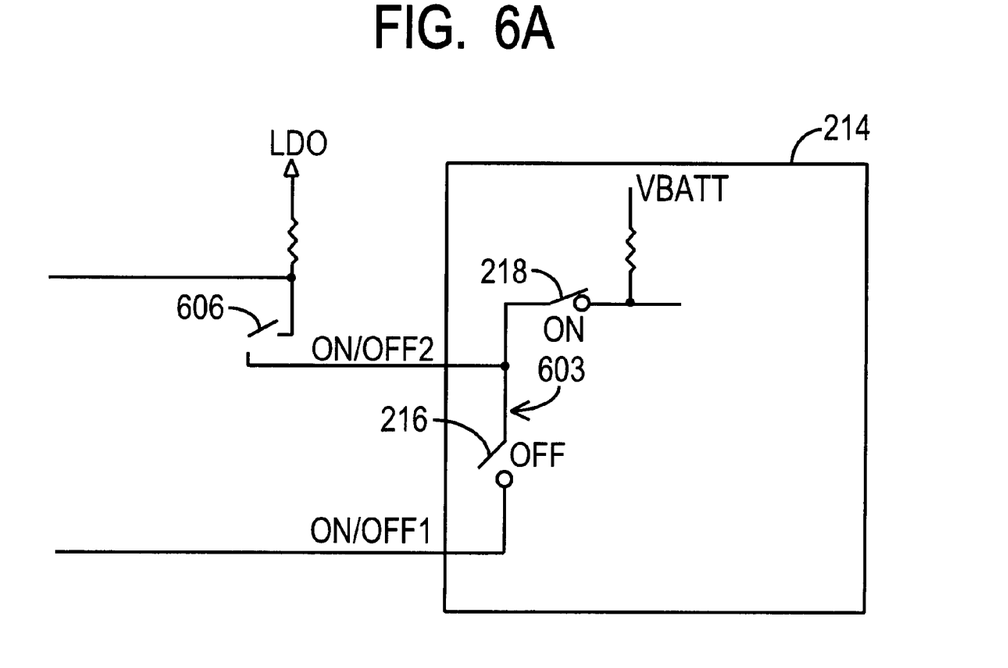
FIG. 6A is a circuit diagram of an exemplary pair of internal switches in a position representative of a "power off" PMU position with an external switch controlled by an external PMU controller.
Figure 6B:
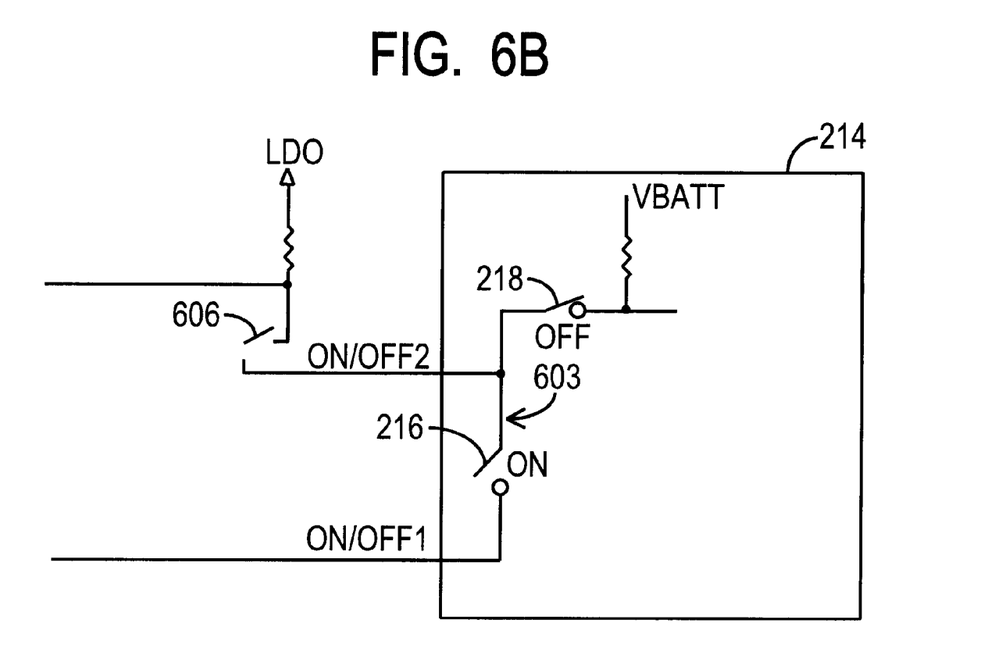
FIG. 6B is a circuit diagram of an exemplary pair of internal switches in a position representative of a "power on" PMU position with an external switch controlled by the PMU.

Advantageously, a PMU consistent with the present invention may include a plurality of internal switches 214 coupled to a switch conductive path 603. Such plurality may include a first internal switch 216 and a second internal switch 218 that allows an external switch 606 to serve multiple functions. For instance, the external switch 606 may be under the control of the PMU 200 or an external controller 110 depending on the position of the internal switches. FIGS. 6A and 6B illustrate exemplary operations of the first internal switch 216 and the second internal switch 218. FIG. 6A illustrates the first internal switch 216 in an open position with the second internal switch 218 in a closed position. In this configuration, the PMU may control the external switch 606.

In contrast to the switch position of FIG. 6A, FIG. 6B illustrates the first internal switch 216 in a closed position and the second internal switch 218 in an open position. With this configuration, the processor 110 of a battery portable device may control the external switch 606. Accordingly, use of internal switches 216, 218 allows a single external switch 606 to carry out multiple functions. For example, the portable battery device may be a cell phone and the external switch may be a start/stop button. The start/stop button may be one button in a keypad matrix. Use of internal switches 216, 218 may then allow the start/stop button to first function as a separate switch controlled by the PMU during the START function and then function as a keypad switch controlled by the controller 110 of the cell phone during the STOP function.

Figure 7:
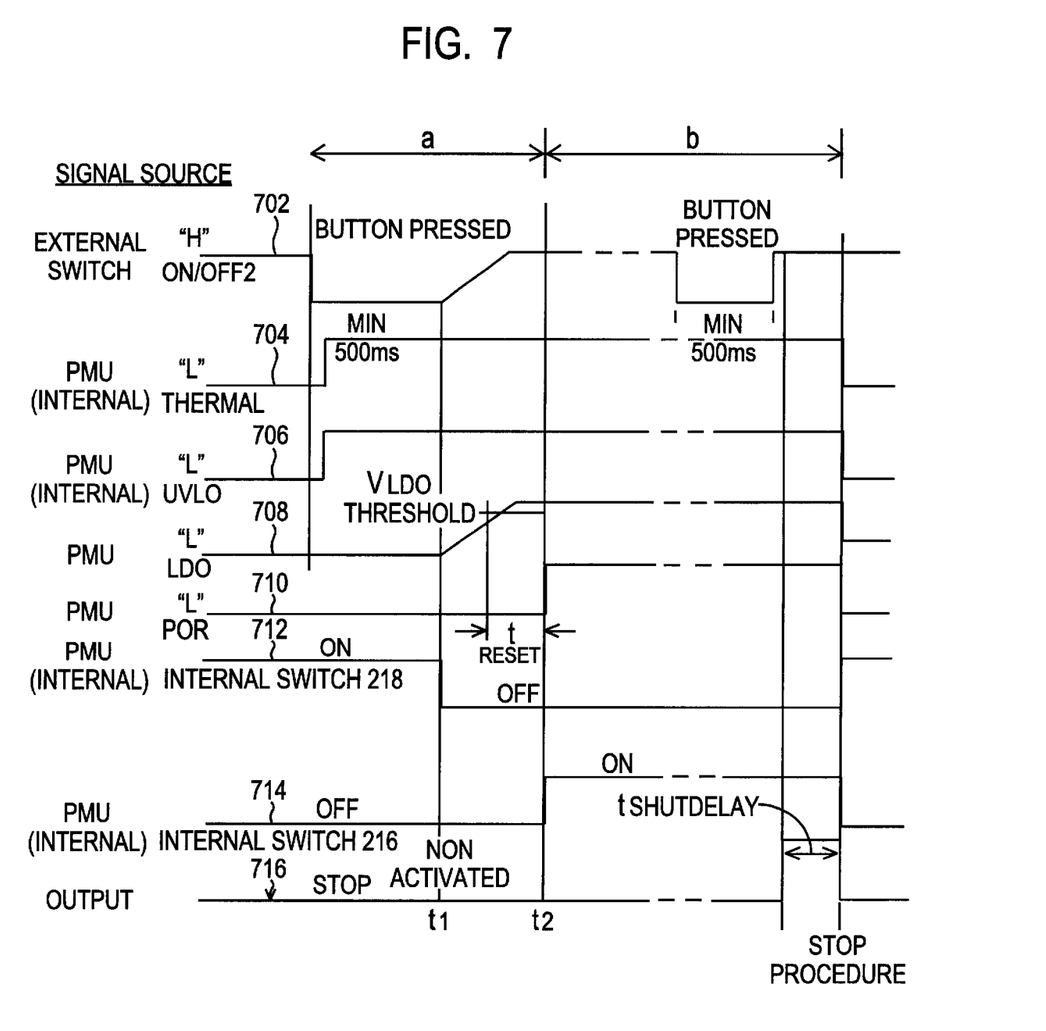
FIG. 7 is an exemplary timing diagram illustrating an exemplary start/stop sequence for a voltage-powered device consistent with the present invention.

FIG. 7 is an exemplary timing diagram illustrating an exemplary start/stop sequence utilizing the UVLO 212 circuit, the thermal protection circuit 210, POR 228, and internal switches 216, 218 to have an external switch 606 under control of either the PMU or the controller 110. Description of the start/stop timing diagram is made with reference to a cell phone device having a PMU consistent with the present invention. Such a start/stop sequence consistent with the present invention could also be utilized in other battery portable devices.

The timing chart includes two basic time frames a and b. During time frame a, the PMU is shut down. During time frame b, the PMU is on and hence the cell phone is on. Plot 702 illustrates operation of the external button. The external switch 606 may be a start/stop button of a cell phone located in a keypad matrix. While the cell phone is currently off, a user must depress the start/stop button for more than at least 500 ms in accordance with GSM standards in order to enable the start process. In addition to depressing the start/stop button, a PMU consistent with the present invention may include a thermal protection circuit 210 that will not permit the cell phone to turn on if the die temperature exceeds an internal threshold temperature limit. Plot 704 illustrates that once the start/stop button is depressed a thermal control signal moves to a high level indicating no high temperature concerns.

In addition, a UVLO 212 circuit would prevent start up until the battery voltage reached a certain satisfactory or enabling voltage level $V_e$. Plot 706 illustrates that once the start/stop button is depressed, a UVLO control signal moves to a high level indicating no under voltage concerns. In addition, a PMU consistent with the present invention may also include a POR circuit 228, which monitors the output voltage of an LDO as illustrated by plot 708. Once the PMU is enabled at time $t_1$, the LDO output voltage starts to rise. Once it reaches a LDO threshold level $V_{LDOthreshold}$, a rest time delay $t_{reset}$ is started. After the reset time delay $t_{reset}$ expires at time $t_2$, a POR control signal 710 may move from a L to H indicating to the controller 110 that normal operation may begin. Therefore, before the POR control signal 710 indicated to the external controller 110 that normal operation may begin, the start/stop button had to be depressed for the required time, the thermal protection circuit 210 had to ensure acceptable die temperature, the UVLO circuit 212 had to ensure acceptable battery voltage, and the POR circuit 228 had to ensure proper LDO output voltage after expiration of a certain amount of time $t_{reset}$. As a result, reliable operation of the PMU is greatly enhanced.

In addition, the first internal switch 216 and second internal switch 218 operate as described earlier with reference to FIGS. 6A and 6B. That is, during time period a while the device is not on yet, the second internal switch 218 remains in the closed or on position as indicated by plot 712 and after at least 500 ms switches into the open or off position. Accordingly, the start/stop button remains under control of the PMU during time period a. When the POR control signal 710 moves to high at time $t_2$, the first internal switch 216 closes or moves to the on position. In addition, the second internal switch 218 as detailed by plot 712 is in the open or off position at this time. Accordingly, the start/stop switch is now under control of the external controller 110 of the cell phone.

The cell phone remains on until the on/off button under control of the controller 110 is again depressed for the requisite amount of time. When this occurs, the controller 110 typically launches a process to disconnect from the wireless network and perform various housekeeping activities. To account for these processes and to prevent the PMU from shutting down by short positive pulses that may appear at this point, a shut down delay time $t_{shutdelay}$ may be utilized. An exemplary $t_{shutdelay}$ depends on the characteristics of the battery portable device and may be approximately 50 ms to 100 ms.

A PMU consistent with the present invention may also include various drivers to drive various elements such as an LED, backlight LED display, keyboard, ringer, vibrator, and the like. Driver 236 may be configured to drive elements such a ringer and a vibrator. Driver 236 may include a pair of PMOS transistors 240, 242. One transistor 240 may be configured to source 60 mA as may be typical for a vibrator, while the other transistor 242 may be configured to source 180 mA as may be typical for a ringer, e.g., with a 1 kHz, 50% duty cycle. Driver 236 may also include logic level input buffers 244, 246 to permit direct logic level control from the controller 110. The power connected to the SP pin may be applied to the load through the PMOS transistors 240, 242 when the signal on either the gate electrode of transistor 240, the GP2 pin 239, or the gate electrode of the other transistor 242, the GP1 pin 241, is at a logic high level.

An additional driver 238 may be included in a PMU consistent with the present invention to drive other elements such as a LED and backlight LED display. The driver 238 may include a pair of NMOS transistors 250, 252 configured to supply up to 100 mA of current. The sources for each NMOS transistor 250, 252 may be coupled together and accessible from the S pin 251. The controller 110 may control the NMOS transistors 250, 252 by applying voltage to the gates of each transistor respectively at the G1 pin 253 and the G2 pin 257. When the voltage applied by the controller exceeds the NMOS threshold level, typically about 1.5 volts, the NMOS switch will turn on. Depending on the magnitude of the drive current, the each NMOS transistor 250, 252 could turn on in nanoseconds.

Advantageously, a PMU consistent with the present invention may also include a battery charge controller 209 configured to rapidly and safely charge a variety of batteries. Batteries may be categorized by various criteria, including charging voltage, and a SET pin 271 may accept a control signal indicating which battery category is in use. The full charge voltage for the particular battery type may be then set accordingly. For example, Lithium ion graphite anode batteries may be one category of batteries and the full charge voltage may be set to approximately 4.1 volts. Lithium ion coke anode, Lithium Polymer, and Nickel Metal Hydride (NiMH) batteries may be another category, and the full charge voltage may be set to approximately 4.2 volts.

Some battery types, e.g., NiMH batteries that have sat for a long time or Lithium Polymer and other batteries that have been subject to high temperature storage, may suffer from a deep discharge and have a battery voltage near zero. If a high charge rate, e.g., >0.3 C, is applied to such a deeply discharged battery, significant damage may occur. Advantageously, a PMU consistent with the present invention may include a battery charge controller 209 that applies a conditioning charge to the battery when the battery has suffered from such a deep discharge, e.g., when the battery voltage is between approximately 0 and approximately 2.4 volts. This conditioning charge is less than the full charge, and then after the battery voltage exceeds a predetermined full charge threshold level $V_{fcthreshold}$, e.g., approximately 2.4 volts in one instance, a full charge is then applied.

Figure 8:
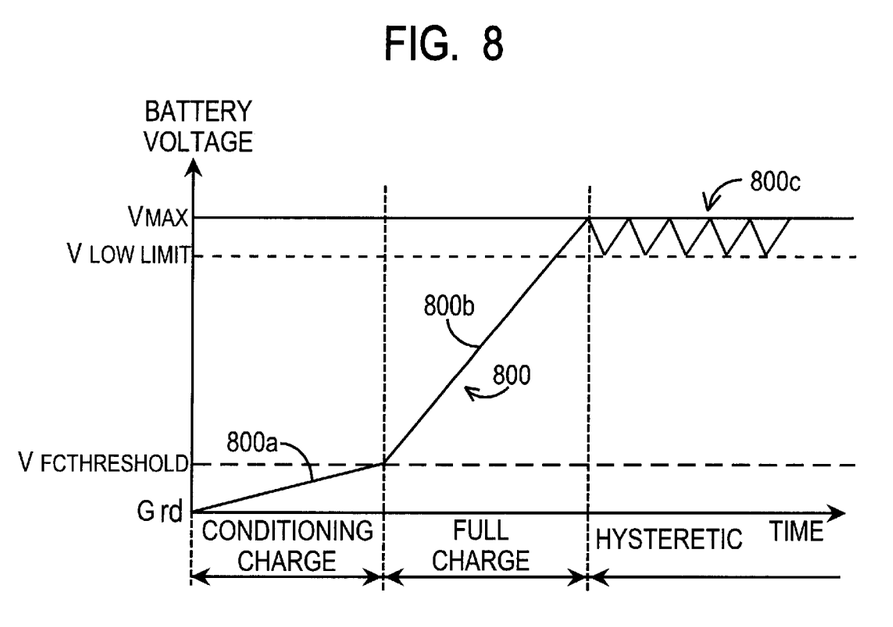
FIG. 8 is an exemplary plot of battery voltage versus time illustrating various charging rates over time depending on the corresponding battery voltage.

FIG. 8 illustrates such a battery charge profile where a plot 800 of battery voltage over time is illustrated. The battery voltage plot 800 includes three portions 800a, 800b, 800c. The first portion 800a of the battery voltage plot 800 occurs when the battery voltage level is below the predetermined full charge battery threshold level $V_{fcthreshold}$. During this time, a conditioning charge less a full charge level is applied to the battery and the battery voltage rises 800a at a relatively lower rate. After the battery voltage reaches $V_{fcthreshold}$, full charge is applied to the battery. The second portion 800b of the battery voltage plot 800 illustrates the battery voltage increasing at a rate more rapidly than the first portion 800a of the battery voltage plot since full charging current is applied.

The third portion 800c of the battery voltage plot 800 illustrates that once $V_{max}$ is attained, the battery charge controller 209 stops charging. The battery voltage is allowed to drop until it reaches $V_{lowlimit}$. At this time, the battery charge controller 209 permits recharging of the battery again and this process continues in this hysteretic (pulsing) charge mode.

One exemplary way of accomplishing such a battery voltage charge scheme is by switch modulation. The battery charge controller 209 may include a first conditioning charge switch 213 and a second full charge switch 211 connected to a first charge conductive path 281 and a second charge conductive path 283, respectively. The first switch 213 may be further connected in series with a resistive element 217 in order to provide a lesser charging current under the conditioning charge phase. Alternately, the second switch 211 is not coupled to any resistive element to provide a greater charging current under the full charge phase. For instance, to apply a conditioning charge, the first switch 213 may be closed, the second switch 211 may be open, and charging current may be lowered and controlled by the value of the restive element 215.

Once $V_{fcthreshold}$ is reached, the second switch 211 may close and the first switch 213 may open permitting full charging current to flow over a second charge conductive path coupled 283 including the second switch 211. The second switch 211 may open once a maximum voltage $V_{maximum}$ is reached and then close again once the battery voltage level drops to $V_{lowlimit}$ and so on in this hysteretic charge mode illustrated by the third portion 800c of the battery voltage plot 800.

For safety reasons, the AC-DC adapter should preferably have a current limit less than or equal to the maximum current that can be supplied through the switches 211 and 213. This also helps to reduce noise that could be generated when the battery reaches its charge termination voltage $V_{maximum}$ and enters the hysteretic mode. The charging function can also be disabled if, in a cell phone device, the cell phone is transmitting or receiving. A PMU consistent with the invention may be configured to perform the charging function any time an AC-DC adapter is plugged into the device, unless the controller 110 forces a charge disable pin, CHG-E\275 on the PMU to a different logic level. Therefore, the charge disable pin 275 may be configured to be responsive to a control signal from an external controller 110 to disable the charging function if instructed by the controller.

Advantageously, a PMU consistent with the present invention may also include a bi-directional pin 273. The bi-directional pin 273 may serve as the input during one condition, e.g., when coupled to an AC-DC adapter, and as an output pin during a second condition, e.g., when coupled to an external load device. The function of the bi-directional pin 273 as either an input or output pin depends on the battery voltage $V_{BATT}$ compared to the voltage an external device imparts to the bi-directional pin 273 or $V_{bi\text{-}dir\ pin}$.

If $V_{bi\text{-}dir\ pin} <= V_{BATT}$, then the bi-directional pin may be an output pin; and if $V_{bi\text{-}dir\ pin} > V_{BATT}$, then the bi-directional pin may be an input pin.

A bi-directional logic circuit 220 coupled to the substrate 203 of the PMU 200 may be equipped with circuitry necessary to provide this functionality. Therefore, if an AC-DC adapter is coupled to the bi-directional pin 273, the voltage at this pin will likely be greater than $V_{BATT}$ and hence the bi-directional pin 273 will function as an input pin for the charging current. However, if an external load is coupled to the bi-directional pin 273, it will likely exert little to no voltage on the pin. Therefore, the bi-directional pin will serve as an output pin allowing the battery of the device to provide power to the external load.

Advantageously, a bi-directional logic circuit 220 may also contain logic to properly identify the presence of either a continuous output adapter or a pulsing output adapter. Such a pulsing output adapter may provide a pulsing voltage on the order of 10 to 20 ms. Detecting the presence of such a pulsing voltage AC-DC adapter requires special consideration as illustrated by FIG. 9.

Figure 9:
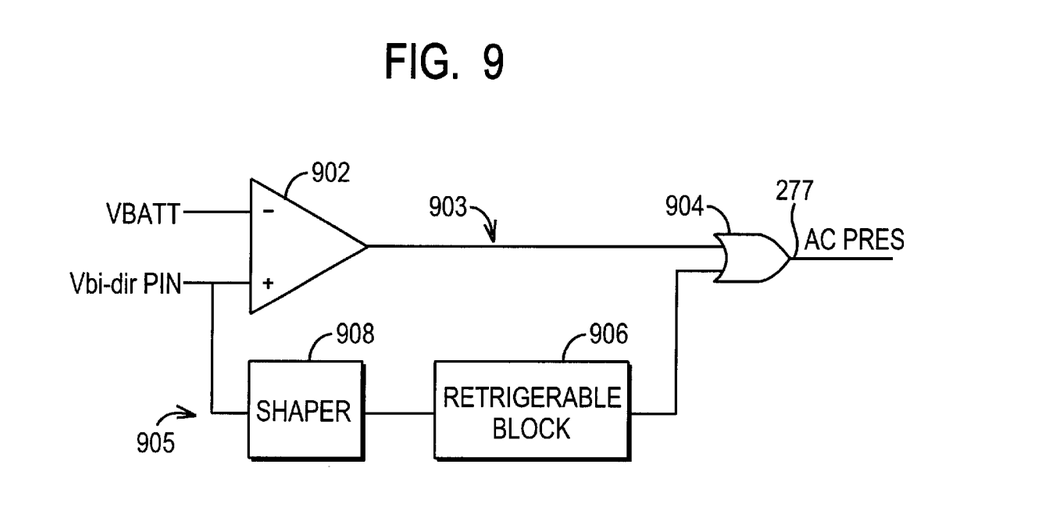
FIG. 9 is a high-level circuit diagram of an exemplary AC-DC adapter detector configured to detect both a continuous output adapter and a pulse output adapter.

FIG. 9 illustrates an adapter detector configuration including a first detector conductive path 903 configured to detect the presence of a continuous output adapter and a second detector conductive path 905 configured to detect the presence of a pulse adapter. The first conductive path 903 may include a comparator 902 to compare the battery voltage $V_{BATT}$ with $V_{bi\text{-}dir\ pin}$ and provide a logical high output if $V_{bi\text{-}dir\ pin} > V_{BATT}$, and provide a logical low output if $V_{bi\text{-}dir\ pin} <= V_{BATT}$. Accordingly, if $V_{bi\text{-}dir\ pin} > V_{BATT}$ the output of the output decision circuit 904, e.g., the OR gate, goes high detecting the presence of an AC-DC adapter and the bi-directional pin 273 of the PMU becomes an input pin.

If the AC-DC adapter output is a pulsing voltage, then the retrigerable block 906 will output a HIGH signal as long as the pulsing voltage is present. The voltage signal from the AC-DC pulsing adapter may be converted to a digital signal by shaper 908 before being input to the retrigerable block 906. Those skilled in the art will recognize a variety of circuit configurations that may be utilized to provide the functionality of the retigerable block 906 and the shaper 908. In order to sense pulsing voltage from AC-DC adapters that may have a period of up to 20 ms, the retrigerable block 906 may also be equipped with a 20 ms minimum delay. When the output of the retrigerable block 906 goes high, the output of the OR gate 904 also goes high detecting the presence of an AC-DC adapter.

Finally, if $V_{CHG\text{-}IN} <= V_{BATT}$, then the output of the comparator 902 goes low, the output of the retrigerable block 906 remains low, and the output of the OR gate 902 goes low. A low output from the OR gate 904 indicates the absence of any AC-DC adapter and, accordingly, the bi-directional pin 273 may function as an output pin in this instance.

Because of all the above-described functionality relating to the battery charge controller 209, a single output charge status pin 277 may advantageously be utilized to provide a plurality of output signals. One signal may indicate the presence or absence of an AC-DC adapter based again on the voltage the external device imparts to the bi-directional pin 273 compared to the battery voltage. A charging status signal may also be imparted to the output charge status pin 277 based on the position of the first conditioning charge switch 213 and the second full charge switch 211. The position of such switches 211, 213 in different charge status conditions was described earlier with reference to FIG. 8. In addition, the same output charge status pin 277 may provide an end-of-charge signal. This signal may be imparted once the adapter is connected and the second full charge switch opens 211 once the maximum battery voltage charge $V_{max}$ is reached.

When earlier describing the UVLO circuit 212, a lockout delay time was described to prevent unintended shut down of the PMU by the UVLO circuit. Such unintended shut down may otherwise occur, for example, in a cell phone device 100 when a power amplifier 107 is activated. In addition to the unintended shut down problems, such a power amplifier may cause unwanted transients in LDO output voltage. For instance, the power amplifier 107 may be switched with a square wave, having a frequency of about 217 Hz. Accordingly, battery voltage transient drops may also mirror this square wave function. In turn, the LDO output voltage may ring at times corresponding to the edges of the battery voltage drop transient. This ringing could induce both phase and frequency parasitic shifting in sensitive LDO load modules such as the local oscillator of a cell phone. This could adversely affect performance of the cell phone as measured by an increase in bit error rate.

To address this problem, some LDOs may be able to fully reject this voltage transient. However, if a chosen LDO cannot fully reject this transient, the best compromise is for the LDO to act like an integrator at both edges of the mark signal, thereby avoiding ringing or other oscillations. An optimized amplitude and phase characteristic allows the LDOs to integrate the rising and falling edges of the pulses at their inputs.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A power management unit (PMU) for providing power management and supply functions to a device having a battery, comprising:

a substrate;

a bi-directional pin coupled to said substrate and configured to serve as an input pin during a first condition and as an output pin during a second condition;

a battery charge controller coupled to said substrate and said bi-directional pin, said battery charge controller having a first charge conductive path and a second charge conductive path, said first charge conductive path providing a first conditioning charge to said battery, and said second charge conductive path providing a second full charge to said battery during said first condition;

an adapter detector configured to receive a signal representative of the voltage of an external device coupled to said bi-directional pin, and to provide a detector output signal representative of the presence of an adapter, said detector output signal providing a positive indication if said adapter is a continuous output adapter or said adapter is a pulse output adapter, said adapter detector coupled to said substrate;

an under voltage lockout protection circuit configured to prevent start up of said PMU until the voltage of said battery is above a threshold lockout enabling level, and configured to shut down said PMU once the voltage of said battery falls below a threshold lockout disabling level, said threshold lockout disabling level set at a lower voltage than said lockout threshold enabling level, said under voltage lockout protection circuit further coupled to said substrate;

a plurality of internal switches coupled to a switch conductive path, said switch conductive path further coupled to an external switch, said internal switches configured to be responsive to said external switch allowing said external switch to have multiple functions, said plurality of internal switches coupled to said substrate; and a power on reset (POR) circuit coupled to said battery, to said substrate, and to at least one low dropout voltage regulator (LDO), said POR circuit configured to provide a POR control signal to an external controller.

2. The PMU of claim 1, wherein said first condition is a battery charging condition and said second condition is a battery supply condition.

3. The PMU of claim 2, wherein said bi-directional pin is coupled to bi-directional logic, said bi-directional logic is configured to compare the voltage of said battery with the voltage of an external device coupled to said bi-directional pin and control whether said bi-directional pin functions as an input pin during said battery charging condition or as an output pin during said battery supply condition.

4. The PMU of claim 3, wherein said bi-directional pin is configured to function as an input pin if said comparison indicates the voltage of said battery is higher than the voltage of said external device, and said bi-directional pin is configured to function as an output pin if said comparison indicates the voltage of said battery is less than or equal to the voltage of said external device.

5. The PMU of claim 1, wherein said first condition is a battery charging condition, and wherein said first conditioning charge is less than said second full charge.

6. The PMU of claim 5, wherein said battery charge controller is configured to apply said first conditioning charge to said battery if the output voltage of said battery is below a predetermined full charge threshold level.

7. The PMU of claim 1, wherein said first charge conductive path comprises a first conditioning charge switch and a resistive element, and said second conductive path comprises a second full charge switch.

8. The PMU of claim 7 wherein said first conditioning charge switch is configured to close and said second full charge switch is configured to open when said first conductive path provides said first conditioning charge to said battery.

9. The PMU of claim 7, wherein said second full charge switch is configured to close and said first conditioning charge switch is configured to open when said second conductive path provides said second full charge to said battery.

10. The PMU of claim 7, wherein said second full charge switch is configured to open once the output voltage of said battery is at a maximum level and is configured to close once the voltage of said battery reaches a low limit.

11. The PMU of claim 1, wherein said adapter detector further comprises:

a first detector conductive path configured to receive said signal representative of the voltage of said external device and provide a first detector path output indicative of the presence of said continuous output adapter;

a second detector conductive path configured to receive said signal representative of the voltage of said external device and provide a second detector path output indicative of the presence of said pulse output adapter; and an output decision circuit configured to receive said first detector path output and said second detector path output and output a digital one if at least one of said outputs is a digital one.

12. The PMU of claim 11, wherein said output decision circuit comprises an OR gate, and where said first detector output path and said second output detector path is coupled to an associated input of said OR gate.

13. The PMU of claim 12, wherein said first detector conductive path comprises a comparator configured to compare the voltage of said battery with the voltage of said external device coupled to said bi-directional pin.

14. The PMU of claim 13, wherein said first detector path output is configured to provide a digital one if the voltage of said battery is less than the voltage of said external device coupled to said bi-directional pin.

15. The PMU of claim 12, wherein said second detector conductive path comprises a retrigerable block, said retrigerable block is configured to output a digital one if a pulsing voltage from said external device is coupled to said bi-directional pin.

16. The PMU of claim 1, wherein said under voltage lockout protection circuit is configured to disable said PMU if the voltage of said battery is below said threshold lockout disabling level for a predetermined lockout delay time.

17. The PMU of claim 16, wherein said predetermined lockout delay time is approximately 50 ms.

18. The PMU of claim 1, wherein said plurality of internal switches comprises a first internal switch and a second internal switch, said first internal switch is configured to open and said second internal switch is configured to close in response to a power down signal from said external switch.

19. The PMU of claim 18, wherein said external switch is configured to be controlled by a controller of said battery portable device.

20. The PMU of claim 1, wherein said plurality of internal switches comprises a first internal switch and a second internal switch, said first internal switch is configured to close and said second internal switch is configured to open in response to a power up signal from said external switch.

21. The PMU of claim 19, wherein said external switch is configured to be controlled by said PMU.

22. The PMU of claim 1, wherein said POR circuit is configured to provide a POR control signal to an external controller.

23. The PMU of claim 22, wherein said POR circuit is further configured to provide a start POR control signal to said external controller once at least one LDO has a voltage level above a predetermined LDO voltage threshold level.

24. A power management unit (PMU) comprising:
a substrate; and
a bi-directional pin coupled to said substrate and configured to serve as an input pin during a first condition and as an output pin during a second condition.

25. The PMU of claim 24, wherein said first condition is a charging condition and said second condition is a supply condition.

26. The PMU of claim 25, wherein said bi-directional pin is coupled to bi-directional logic, said bi-directional logic is configured to compare the voltage of said battery with the voltage of an external device coupled to said bi-directional pin and control whether said bi-directional pin functions as an input pin during said battery charging condition or as an output pin during said battery supply condition.

27. The PMU of claim 26, wherein said bi-directional pin is configured to function as an input pin if said comparison indicates the voltage of said battery is higher than the voltage of said external device, and said bi-directional pin is configured to function as an output pin if said comparison indicates the voltage of said battery is less than or equal to the voltage of said external device.

28. A power management unit (PMU) for providing power management and supply functions to a device having a battery comprising:

a substrate; and a battery charge controller coupled to said substrate, said battery charge controller having a first charge conductive path and a second charge conductive path, said first charge conductive path providing a first conditioning charge to said battery, and said second charge conductive path providing a second full charge to said battery during said first condition.

29. The PMU of claim 28, wherein said first condition is a battery charging condition, and wherein said first conditioning charge is less than said second full charge.

30. The PMU of claim 29, wherein said battery charge controller is configured to apply said first conditioning charge to said battery if the output voltage of said battery is below a predetermined full charge threshold level.

31. The PMU of claim 28, wherein said first charge conductive path comprises a first conditioning charge switch and a resistive element, and said second conductive path comprises a second full charge switch.

32. The PMU of claim 31 wherein said first conditioning charge switch is configured to close and said second full charge switch is configured to open when said first conductive path provides said first conditioning charge to said battery.

33. The PMU of claim 31, wherein said second full charge switch is configured to close and said first conditioning charge switch is configured to open when said second conductive path provides said second full charge to said battery.

34. The PMU of claim 31, wherein said second full charge switch is configured to open once the output voltage of said battery is at a maximum level and is configured to close once the voltage of said battery reaches a low limit.

35. A power management unit (PMU) for providing power management and supply functions to a device having a battery comprising:

a substrate;

a bi-directional pin coupled to said substrate; and an adapter detector configured to receive a signal representative of the voltage of an external device coupled to said bi-directional pin, and to provide a detector output signal representative of the presence of an adapter, said detector output signal providing a positive indication if said adapter is a continuous output adapter or said adapter is a pulse output adapter, said adapter detector coupled to said substrate.

36. The PMU of claim 35, wherein said adapter detector further comprises:

a first detector conductive path configured to receive said signal representative of the voltage of said external device and provide a first detector path output indicative of the presence of said continuous output adapter;

a second detector conductive path configured to receive said signal representative of the voltage of said external device and provide a second detector path output indicative of the presence of said pulse output adapter; and an output decision circuit configured to receive said first detector path output and said second detector path output and output a digital one if at least one of said outputs is a digital one.

37. The PMU of claim 36, wherein said output decision circuit comprises an OR gate, and where said first detector output path and said second output detector path is coupled to an associated input of said OR gate.

38. The PMU of claim 37, wherein said first detector conductive path comprises a comparator configured to compare the voltage of said battery with the voltage of said external device coupled to said bi-directional pin.

39. The PMU of claim 38, wherein said first detector path output is configured to provide a digital one if the voltage of said battery is less than the voltage of said external device coupled to said bi-directional pin.

40. The PMU of claim 38, wherein said second detector conductive path comprises a retrigerable block, said retrigerable block is configured to output a digital one if a pulsing voltage from said external device is coupled to said bi-directional pin.

41. A power management unit (PMU) for providing power management and supply functions to a device having a battery comprising:

a substrate; and an under voltage lockout protection circuit configured to prevent start up of said PMU until the voltage of said battery is above a threshold lockout enabling level, and configured to shut down said PMU once the voltage of said battery falls below a threshold lockout disabling level, said threshold lockout disabling level set at a lower voltage than said lockout threshold enabling level, said under voltage lockout protection circuit further coupled to said substrate.

42. The PMU of claim 41, wherein said under voltage lockout protection circuit is configured to disable said PMU after the voltage of said battery falls below said threshold lockout disabling level for a predetermined lockout delay time.

43. The PMU of claim 42, wherein said predetermined lockout delay time is approximately 50 ms.

44. A power management unit (PMU) comprising:

a substrate; and a plurality of internal switches coupled to a switch conductive path, said switch conductive path further coupled to an external switch, said internal switches configured to be responsive to said external switch allowing said external switch to have multiple functions, said plurality of internal switches coupled to said substrate.

45. The PMU of claim 44, wherein said plurality of internal switches comprises a first internal switch and a second internal switch, said first internal switch is configured to open and said second internal switch is configured to close in response to a power down signal from said external switch.

46. The PMU of claim 45, wherein said external switch is configured to be controlled by an external controller.

47. The PMU of claim 44, wherein said plurality of internal switches comprises a first internal switch and a second internal switch, said first internal switch is configured to close and said internal switch is configured to open in response to a power up signal from said external switch.

48. The PMU of claim 46, wherein said external switch is configured to be controlled by said PMU.

49. A power management unit (PMU) comprising:
a substrate; and
a power on reset (POR) circuit coupled to said substrate, and to at least one low dropout voltage regulator (LDO).

50. The PMU of claim 49, wherein said POR circuit is configured to provide a POR control signal to an external controller.

51. The PMU of claim 50, wherein said POR circuit is further configured to provide a start POR control signal to said external controller once at least one LDO has a voltage level above a predetermined LDO voltage lockout threshold level.

52. A power management unit (PMU) comprising:
a substrate; and
an adapter detector configured to receive a signal representative of the voltage of an external device and to provide a detector output signal representative of the presence of an adapter, said detector output signal providing a positive indication if said adapter is a continuous output adapter or said adapter is a pulse output adapter, said adapter detector coupled to said substrate; and
a multi-function output charge status pin.

53. The PMU of claim 52, wherein said multi-function output charge status pin is configured to display the presence of an adapter when said adapter detector provides said positive indication.

54. The PMU of claim 52, wherein said multi-function output charge status pin is configured to display the absence of an adapter when said adapter detector does not provide said positive indication.

55. The PMU of claim 52, wherein said multi-function output charge status pin is configured to provide an end-of-charge signal when the voltage of said battery reaches a maximum voltage level.

56. A power management unit (PMU) for providing power management and supply functions to a device having a battery, comprising:
a substrate;
a bi-directional pin coupled to said substrate and configured to serve as an input pin during a first condition and as an output pin during a second condition;
a means for providing a first conditioning charge to said battery and second full charge to said battery, said means coupled to said substrate and said bi-directional pin;
a means for detecting the presence of an adapter and providing a positive indication if said adapter is a continuous output adapter or a pulse output adapter, said means for detecting coupled to said substrate;
a means for protecting the PMU from starting up if the voltage of said battery is below a threshold lockout enabling voltage level and from shutting down until the voltage of said battery is below a threshold disabling voltage level, said threshold lockout disabling voltage level set lower than said threshold lockout enabling voltage level;
a means for switching so that an external switch coupled to said switching means may have multiple functions; and a means for enabling at least one LDO to provide power to an external controller if said at least on LDO has an output voltage greater than a predetermined LDO threshold voltage level.

57. A method of inputting and outputting power to and from a power management unit (PMU) having a voltage source comprising:
connecting an external device to a bi-directional pin of said PMU;
triggering a first condition or a second condition;
inputting power through said bi-directional pin from said external device during said first condition; and
outputting power through said bi-directional pin to said external device from said voltage source of said PMU during said second condition.

58. The method of claim 57, wherein said first condition is a charging condition and said second condition is a supply condition.

59. The method of claim 58, wherein said triggering step is determined by comparing the voltage of said voltage source to the voltage of said external device.

60. The method of claim 59, wherein said inputting step is performed if the voltage of said voltage source is higher than the voltage of said external device.

61. The method of claim 59, wherein said outputting step is performed if the voltage of said voltage source is less than or equal to the voltage of said external device.

62. A method of detecting an adapter coupled to a power management unit (PMU) comprising:
receiving a signal representative of the voltage of said adapter;
providing a positive indication if said adapter is a continuous output adapter; and
providing a positive indication if said adapter is a pulse output adapter.

63. A method of protecting a power management unit (PMU) from entering a start up mode comprising:
detecting the voltage of a power source for said PMU;
preventing start up of said PMU if the voltage of said power source is below a predetermined threshold lockout enabling voltage level; and
shutting down said PMU if the voltage of said power source is below a predetermined threshold lockout disabling voltage level set lower than said threshold lockout enabling voltage level.

64. The method of claim 63, wherein said shutting down step does not occur until the voltage of said power source is below said predetermined threshold lockout disabling voltage level for a predetermined lockout time.

65. The method of claim 64, wherein said predetermined lockout time is approximately 50 ms.

66. A method of protecting an external controller of a portable device, powered by a power management unit (PMU), from starting up until proper supply voltage is present comprising:
detecting the voltage of at least one LDO of said PMU; and
preventing said at least one LDO from providing voltage to said controller until the voltage of said at least one LDO is greater than a predetermined LDO voltage threshold level for a predetermined reset time.

67. A power management unit (PMU) for providing power management and supply functions to a device having a battery, comprising:
a substrate;

a bi-directional pin coupled to said substrate and configured to serve as an input pin during a first condition and as an output pin during a second condition; and a battery charge controller coupled to said substrate and said bi-directional pin, said battery charge controller having a first charge conductive path and a second charge conductive path, said first charge conductive path providing a first conditioning charge to said battery, and said second charge conductive path providing a second full charge to said battery during said first condition.

68. The PMU of claim 67, further comprising:

an adapter detector configured to receive a signal representative of the voltage of an external device coupled to said bi-directional pin, and to provide a detector output signal representative of the presence of an adapter, said detector output signal providing a positive indication if said adapter is a continuous output adapter or said adapter is a pulse output adapter, said adapter detector coupled to said substrate.

69. The PMU of claim 68 further comprising:

an under voltage lockout protection circuit configured to prevent start up of said PMU until the voltage of said battery is above a threshold lockout enabling level, and configured to shut down said PMU once the voltage of said battery falls below a threshold lockout disabling level, said threshold lockout disabling level set at a lower voltage than said lockout threshold enabling level, said under voltage lockout protection circuit further coupled to said substrate.

70. The PMU of claim 69, further comprising:

a plurality of internal switches coupled to a switch conductive path, said switch conductive path further coupled to an external switch, said internal switches configured to be responsive to said external switch allowing said external switch to have multiple functions, said plurality of internal switches coupled to said substrate.

71. The PMU of claim 67, further comprising:

a disable pin coupled to said substrate, said disable pin configured to be responsive to an external signal for disabling said first conditioning charge or said second full charge.

\* \* \* \* \*

UNITED STATES PATENT AND TRADEMARK OFFICE
CERTIFICATE OF CORRECTION

PATENT NO. : 6,507,173 B1
DATED : January 14, 2003
INVENTOR(S) : Spiridon et al.

It is certified that error appears in the above-identified patent and that said Letters Patent is hereby corrected as shown below:

<u>Title page,</u>
Item [73], Assignee, please delete "02 Micro" and replace with -- O2Micro --.

Signed and Sealed this

Third Day of June, 2003

JAMES E. ROGAN
*Director of the United States Patent and Trademark Office*